United States Patent
Hansen et al.

(10) Patent No.: US 6,886,016 B2
(45) Date of Patent: Apr. 26, 2005

(54) METHOD AND SYSTEM FOR SUPPORTING MULTIVALUE ATTRIBUTES IN A DATABASE SYSTEM

(75) Inventors: Lynda A. Hansen, San Jose, CA (US); Thomas S. Lee, San Jose, CA (US); Mayank V. Shah, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 09/954,306

(22) Filed: Sep. 12, 2001

(65) Prior Publication Data

US 2003/0055834 A1 Mar. 20, 2003

(51) Int. Cl.[7] .............................................. G06F 17/00
(52) U.S. Cl. ...................................................... 707/102
(58) Field of Search ................................ 707/1–4, 100, 707/102, 104.1; 710/17; 713/193; 382/112; 709/231

(56) References Cited

U.S. PATENT DOCUMENTS

| | | | | |
|---|---|---|---|---|
| 5,255,329 A | * | 10/1993 | Tanimizu et al. | ............ 382/112 |
| 5,291,583 A | | 3/1994 | Bapat | |
| 5,530,899 A | * | 6/1996 | MacDonald | ................. 710/17 |
| 5,706,449 A | | 1/1998 | Liu et al. | |
| 5,819,086 A | | 10/1998 | Kroenke | |
| 5,907,837 A | * | 5/1999 | Ferrel et al. | .................... 707/3 |
| 5,963,642 A | * | 10/1999 | Goldstein | ................... 713/193 |
| 6,035,304 A | * | 3/2000 | Machida et al. | ......... 707/104.1 |
| 6,421,656 B1 | * | 7/2002 | Cheng et al. | ................... 707/2 |

FOREIGN PATENT DOCUMENTS

| | | |
|---|---|---|
| JP | 6020241 | 2/1985 |
| WO | WO96/641282 | 12/1996 |

OTHER PUBLICATIONS

Mike Ganz, Multi Value Database Structure 1998.*

* cited by examiner

*Primary Examiner*—Alford Kindred
*Assistant Examiner*—Sana Al-Hashemi
(74) *Attorney, Agent, or Firm*—Sawyer Law Group LLP

(57) ABSTRACT

A method and system for supporting multivalue attributes in a database system is disclosed. The method and system includes defining an index class by designating a plurality of attributes associated with the index class, wherein the plurality of attributes includes single value attributes and at least one multivalue attribute, generating an attribute value table for the index class for storing attribute values for the single value attributes, and generating a multiple value table for each of the at least one multivalue attributes for storing attribute values for the at least one mulitvalue attributes.

29 Claims, 6 Drawing Sheets

US 6,886,016 B2

METHOD AND SYSTEM FOR SUPPORTING MULTIVALUE ATTRIBUTES IN A DATABASE SYSTEM

FIELD OF THE INVENTION

The present invention relates to database management systems and more particularly to a database management system that supports multivalue attributes.

BACKGROUND OF THE INVENTION

Database management systems (DBMSs) are widely used information resources for enterprises. One highly successful DBMS model is the relational database that is organized and accessed according to relationships between units of data in a database. The relations are typically manifested or embodied in the form of tables. Each table expresses some association between units of database content.

While database system architectures continue to evolve, many new forms of data having multiple attributes, complex internal structures, and specialized behaviors are being stored in databases. Database management tools, such as the Content Manager product available from International Business Machines Corporation, Armonk, N.Y., allow users to handle such complex data objects. The data model of current database management tools allow a user to define an index class representing an object. An index class defines the subject of a table, or group of tables. It contains a plurality of properties or attributes defined by the user. So, for example, the user can identify an index class corresponding to "Patient." The index class Patient could include attributes: Last Name, First Name, Social Security Number, Date Admitted, and Doctor.

While the index class can accommodate multiple attributes, each attribute can be assigned only one value. This presents a problem if an attribute contains more than one value, i.e., the attribute is a multivalue attribute. For instance, in the above example, the attribute "Doctor" may contain multiple values, i.e., a patient may have more than one doctor. One approach to handling multivalue attributes is to sting the attribute values together and separate them with a separator, such as a comma or semicolon.

While this approach provides a way for associating multiple values with a single attribute, it presents new problems for data retrieval and data updating. For instance, suppose the user desired a list of all patients having a doctor named "Jones." The DBMS would process the query and resultant set should include all patients having Doctor Jones as their sole doctor, as well as, all patients having Doctor Jones is one of several doctors. Under normal circumstances, the DBMS would perform an index search along the attribute Doctor. Such a search, however, would miss patients having Jones as one of several doctors because the string of characters (Jones) is included with other characters (names of other doctors) for the attribute. If wildcard indicators are used to try to isolate the string of characters, "Jones," then the resultant set might also include undesired doctor names, such as "Joneson."

Thus, an index search would not produce the desired resultant set. In the alternative, a table scan would need to be performed. Such a search is very costly in time and database resources.

Accordingly, a need exists for a system and method for supporting multivalue attributes in a database system, while maintaining high performance. The present invention addresses such a need.

SUMMARY OF THE INVENTION

A method and system for supporting multivalue attributes in a database system is disclosed. The method and system includes defining an index class by designating a plurality of attributes associated with the index class, wherein the plurality of attributes includes single value attributes and at least one multivalue attribute, generating an attribute value table for the index class for storing attribute values for the single value attributes, and generating a multiple value table for each of the at least one multivalue attributes for storing attribute values for the at least one mulitvalue attributes.

Through the aspects of the present invention, each multivalue attribute of an index class is represented by a separate table, a multiple value table. The multiple value table comprises two columns, the first column stores an item ID and the second column stores an attribute value. The item ID is an identifier corresponding to a record in the index class. Each row in the multiple value table corresponds to a single value of the multivalue attribute of the index class. Thus, one or more rows in the table can have the same item ID, but different attribute values. Using the multiple value table, an index scan can be performed to retrieve or update data corresponding to the associated multivalue attribute. Thus, data management becomes more efficient and less costly.

DETAILED DESCRIPTION

The present invention relates to database management systems and more particularly to a database management system that supports multivalue attributes. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a preferred embodiment of the present invention, the data model of a current database management tool, such as Content Manager, is modified to allow a user, at the time of creating or modifying an index class, to specify whether an attribute of the index class is a multivalue attribute. If one or more attributes of the index class have been specified as multivalue attributes, Content Manager will generate a separate table for each of the multivalue attributes, where each row in the table stores an identifier and one value for the multivalue attribute. Thus, the user can enter multiple values for an attribute when entering data for an item, and allow these multiple values to be stored in the database. A subsequent user can retrieve these values using basic search techniques using the database management tool. The user can also replace one or more of these values with a different set of values for this item, if needed.

Figure 1:
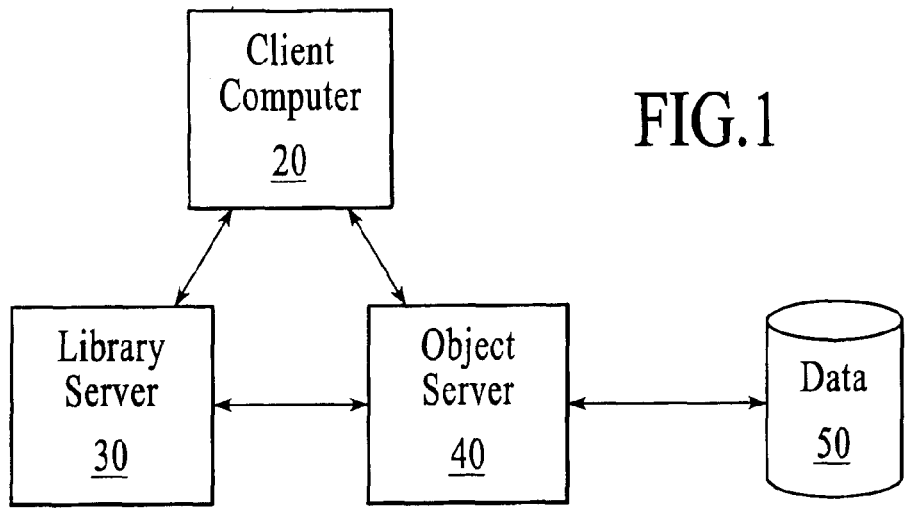
FIG. 1 illustrates a block diagram of the system in accordance with a preferred embodiment of the present invention.

FIG. 1 is a block diagram depicting an environment that may be used with the present invention. A client computer or server 20 typically executes a client application and is coupled to a library computer or server 30 and a related object server 40, which may comprise a database 50. These systems are coupled to one another by various networks (not shown), including LANs, WANs, SNA networks, and the Internet. While only one object server 40 is depicted, one skilled in the art will readily recognize that serveral object servers could be coupled to the library server 30 and client server 20.

The library server 30 typically executes server software, such as IBM's Content Manager server software. The library server 30 also uses a data source interface (now shown) and, possibly, other computer programs, for connecting to the object server 40. The client computer 20 is bidirectionally coupled with both the library server computer 30 and the object server 40 over a line of via a wireless system. In turn, the library server computer 30 is also bidirectionally coupled to the object server 40.

The data source interface may be connected to a DBMS (not shown), which supports access to an object server 40 by executing a relational database management system software. The interface and the DBMS may be located on the same server as the library server computer 30 or may be located on a separate machine. In addition, the object servers 40 may be geographically distributed.

Figure 2:
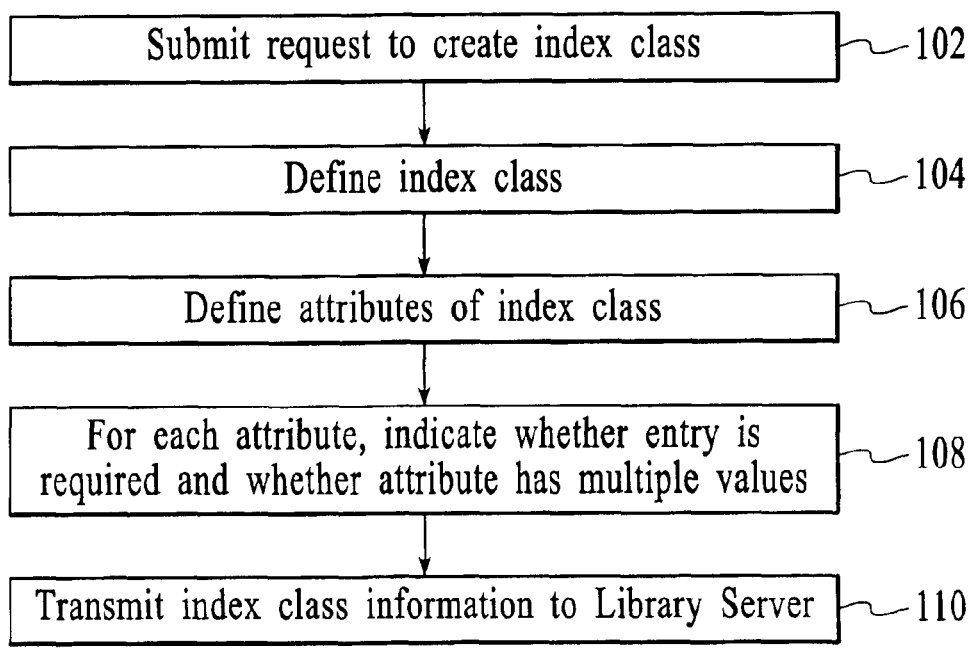
FIG. 2 illustrates a flow chart illustrating a process for defining an index class in accordance with a preferred embodiment of the present invention.
Figure 2A:
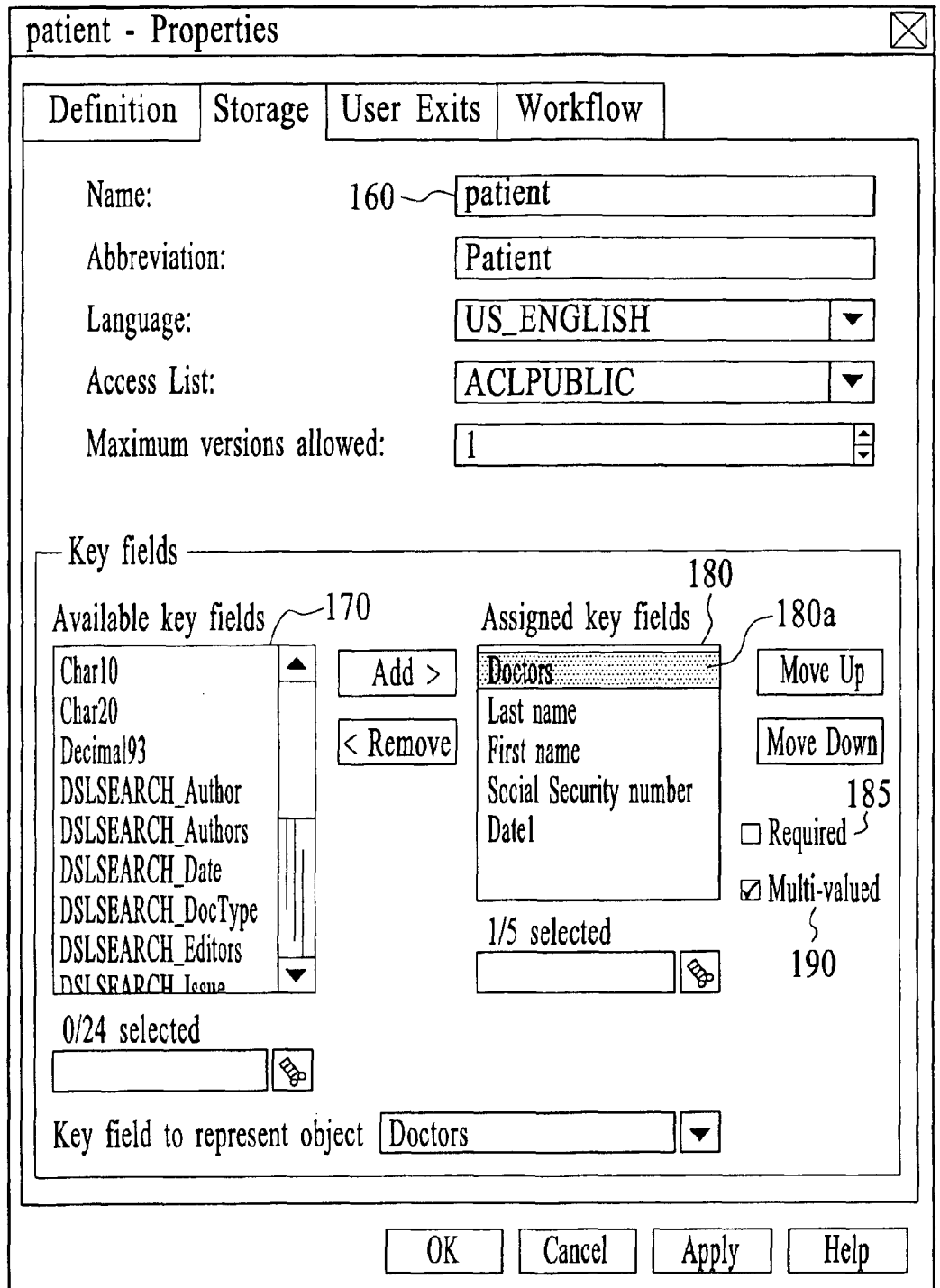
FIG. 2A illustrates a computer generated window which can be utilized in accordance with the preferred embodiment of the present invention.

FIG. 2 is a flow diagram illustrating a process 100 by which the user creates an index class and defines its attributes according to a preferred embodiment of the present invention. Prior to initiating this process 100, the user preferably has determined which attributes are needed to define the index class. The process 100 begins by the user submitting a request to create an index class (step 102). The request may be generated by the user, through an application program interface resident on the client computer 20, by clicking an icon which launches an application, or by any other method well known to those skilled in the art. In response to the user's request, the user will be prompted in step 104 to define the index class, e.g., by naming the index class. As shown in FIG. 2A, the application will open a window 150 that allows the user to enter the index class name into a name field 160.

Next, in step 106, the user a plurality of attributes associated with the index class. As shown in FIG. 2A, the user can select from a list of available or existing attributes (key fields) 170. Thus, in FIG. 2A, the user has defined the index class Patient, and assigned or created the following attributes 180: Last Name, First Name, Social Security Number, Date Admitted (Date 1), and Doctor. If an attribute is not listed, the user can add a new attribute to the list 170 by exiting the application (after saving or canceling the session) and modifying the list of available attributes 170 directly. As one skilled in the art would readily appreciate, there are several ways in which the list of attributes 170 could be modified, for example, the user could be allowed to add new attributes while in the application. The above described method is not meant to limit in any way the scope of the present invention.

For each attribute, characteristic properties such as, type and minimum value/maximum value, are set for listed attributes. The attribute type refers to the type of value that will be entered for the attribute. So, for instance, the attribute type for attribute Last Name would be alphabetic characters (char) and the attribute type for attribute Social Security Number would be numbers (num). Minimum and maximum values can refer to the size of a field, or a range in which the attribute value must fall. As one skilled in the art would readily recognize, other properties could be designated, and the present invention is not limited to the examples provided above.

Furthermore, for each attribute, the user can indicate whether an entry is required (by marking the Required box 185) and whether the attribute has multiple values (by marking the Multi-valued box 190), via step 108. In this step, the user specifies one or more multivalue attributes. Thus, during data input for the index class, the user can enter multiple values for those attributes so specified. So, for instance, referring again to index class Patient, the user has designated attribute Doctors 180a as a multivalue attribute, and the system would accept multiple values for that attribute. After the user has completed the process of defining the index class, the information is transmitted to the library server 30, via step 110.

Although the above description focuses on defining an index class, it should be clear to those skilled in the art that the same process could be utilized for modifying an existing index class before it is used to store an item. Thus, a user can modify an index class before it is used by adding or deleting attributes, or changing an attribute's status from a single value attribute to a multivalue attribute in accordance with the preferred embodiment of the present invention. In short, the present invention is not limited to creating a new index class.

Figure 3:
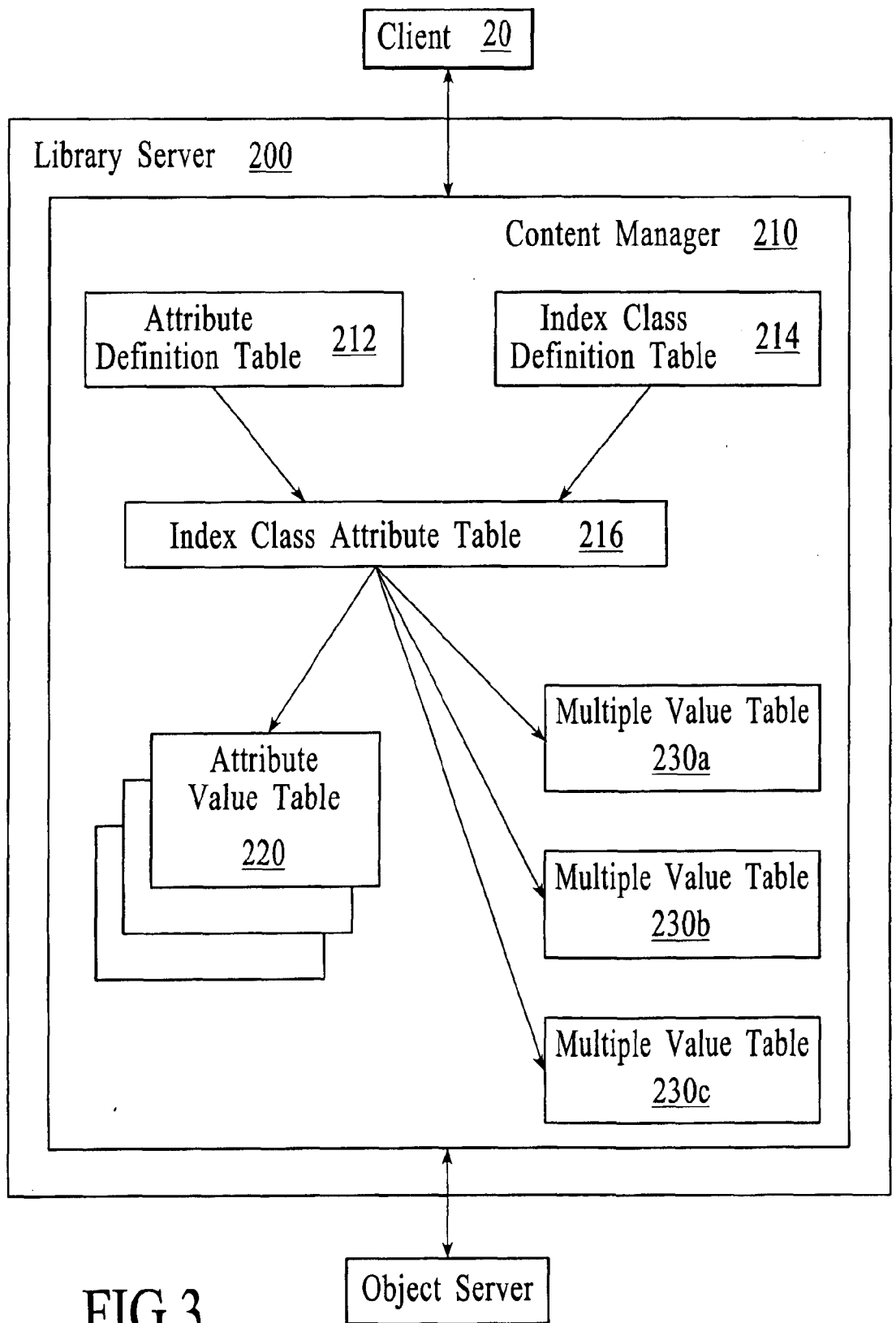
FIG. 3 is a block diagram of the system in accordance with a preferred embodiment of the present invention.

FIG. 3 is a block diagram of the library server 200 in accordance with a preferred embodiment of the present invention. As is shown, the library server 200 includes a Content Manager (CM) module 210. The CM module 210 includes an Attribute definition table 212, an Index Class Definition Table 214, and a Index Class Attributes Table 216. These three tables are universal tables in that they are not dedicated to any particular index class or object. Rather these tables are resources for the CM module 210. Tables 1, 2, and 3 are examples of the Attribute Definition Table 212, the Index Class Definition Table 214, and the Index Class Attribute Table 216, respectively.

TABLE 1

Attribute Definition Table

| Name | ID | Type | Minimum | Maximum |
|---|---|---|---|---|
| Last Name | 00001 | Char | 2 | 50 |
| First Name | 00002 | Char | 2 | 50 |
| Social Sec. No. | 00003 | Num | 9 | 11 |
| Date Admitted | 00004 | Date | — | — |
| Doctors | 00005 | Char | 2 | 50 |
| . . . | . . . | . . . | . . . | . . . |

As is seen, the Attribute Definition Table 212 (Table 1) lists all attributes defined by the user at all times. So, for instance, Table 1 includes the attributes Last Name, First Name, Social Security Number, Date Admitted and Doctors, as well as any other existing attributes for other index classes. Each attribute is identified by a unique identification, in this case, a five digit number, and defined by its characteristic properties, such as type, and minimum and maximum value. For the sake of illustration only, Table 1 indicates that the Attribute Definition Table 212 includes a "Name" column. In the preferred embodiment of the present invention, however, the values of such a column, i.e., one that is language dependent, would not be included in the Attribute Definition Table 212. Rather, such values would be stored in a National Language Support (NLS) Key Words Table (not shown). By cross-referencing the attribute identification number (column) "ID" in the Attribute Definition Table 212) with the NLS Key Words Table, the system and method of the present invention can support multiple languages, as is well known to those skilled in the art.

TABLE 2

Index Class Definition Table

| ID | Name |
|---|---|
| ... | ... |
| 00100 | Patient |
| 00101 | Billing |
| ... | ... |

The Index Class Definition Table 214 (Table 2) lists all index classes and their respective identification numbers. As stated above, the Index Class Definition Table 214 would preferably be stored in the NLS Key Words Table.

TABLE 3

Index Class Attribute Table

| Index Class ID | Attribute ID | Required? | Multivalue? |
|---|---|---|---|
| ... | ... | ... | ... |
| 00100 | 00001 | X | |
| 00100 | 00002 | X | |
| 00100 | 00003 | X | |
| 00100 | 00004 | | |
| 00100 | 00005 | X | X |
| 00101 | ... | ... | ... |

The Index Class Attribute Table 216 (Table 3) indicates which attributes are associated with a particular class, and whether values are required and whether an attribute has multiple values. These three tables incorporate all the information submitted by the user in defining the index class.

Referring back to FIG. 3, the Content Manager 210 also includes a plurality of Attribute Values Table 220 (AVTs) and Multiple Value Tables 230 (MVTs). The AVTs 220 and MVTs 230 store attribute values and are derived from the Attribute Definition Table 212, Index Class Definition Table 214, and Index Class Attributes Table 216. For each index class, one AVT 220 is created stores the values for the single value attributes of the index class. Each AVT 220 is identified by an AVT label (not shown), which refers to the index class identification number stored in the Index Class Definition Table, as well as in the Index Class Attribute Table. Table 4 is an example of an AVT 220 for the index class Patient. The table is identified by the AVT label "AVT00100."

TABLE 4

Attribute Value Table
AVT00100 (Patient)

| Item ID Serial No. | 00001 (Last Name) | 00002 (First Name) | 00003 (Soc. Sec. No.) | 00004 (Date Ad) |
|---|---|---|---|---|
| AR@3EW##1K | Smith | Adam | 012345678 | Jan. 1, 2001 |
| ... | ... | ... | ... | ... |

The AVT 220 stores the values for the single value attributes of Patient. The Item ID serial number identifies a particular item or record in Patient, in this case, the record of patient Adam Smith.

MVTs 230 store the values for multivalue attributes. For each multivalue attribute in the index class, one MVT 230 is created. Thus, if the user has defined an index class having three attributes designated as multivalue attributes, three separate MVTs (230a, 230b, 230c) will be created corresponding to each multivalue attribute to store values associated with each such attribute. As with the AVTs 220, each MVT 230 is identified by a MVT label (not shown), which refers to the attribute identification number (stored in the Attribute Definition Table) and the index class identification number (stored in the Index Class Definition Table), stored in the Index Class Attribute Table. Because index class Patient has one multivalue attribute, Doctors, one MVT 230 will be created for Patient. Table 5 is an example of an MVT 230 for the index class Patient.

TABLE 5

Multivalue Table
MVT00005/00100 (Doctors/Patient)

| Item ID Serial No. | 00005 (Doctors) |
|---|---|
| AR@3EW##1K | Jones |
| AR@3EW##1K | Wong |
| AR@3EW##1K | Flores |
| ... | ... |

As is seen, the MVT 230 differs from the AVT 230 in that each row in the MVT stores one value for a multivalue attribute. All rows that represent multiple values of the same item or record will have the same item ID serial number. By storing values in the MVT in this manner, an index scan can now be performed on the attribute Doctors.

Figure 4:
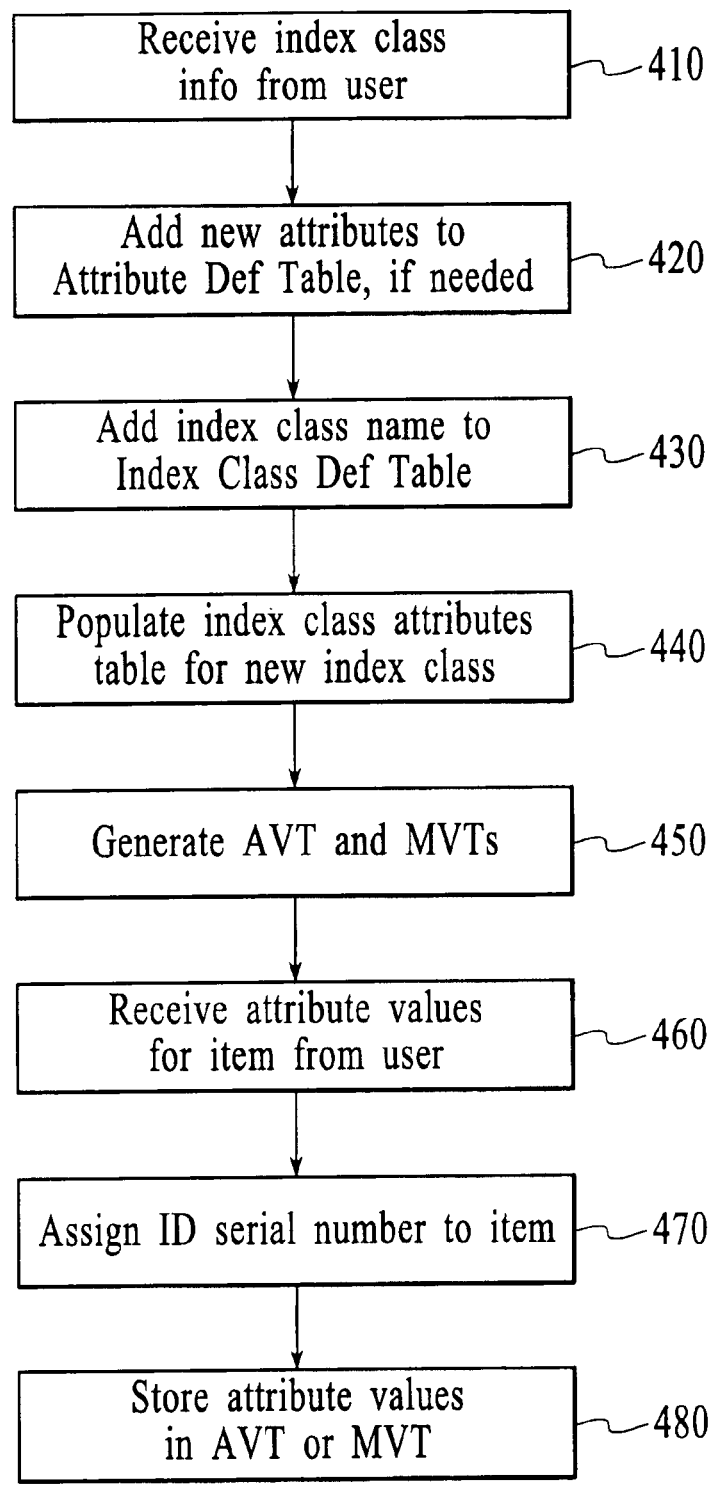
FIG. 4 is a flow chart illustrating the process of storing multivalue attributes in accordance with the preferred embodiment of the present invention.

FIG. 4 is a flowchart illustrating the process 400 of storing the single value and multivalue attributes in accordance with the preferred embodiment of the present invention. The process 400 begins at step 410 when the Content Manager 210 receives the index class definition data provided by the user (e.g., step 114 in FIG. 2). The Content Manager updates the Attribute Definition Table 212 if new attributes are identified in step 420, and in step 430, updates the Index Class Definition Table 214 to add the new index class. Next, in step 450, the Index Class Attributes Table is populated using the information provided by the user regarding the new index class and its attributes. From these tables, the Content Manager 210 then generates the AVT 220 and any MVTs 230 associated with the index class.

The Content Manager is now ready to store attribute values associated with an item in the index class. In step 460, attribute values for an item in an index class are received. The Content Manager 210 assigns an item ID serial number for each item, via step 470. Thereafter, the attribute values associated with that item are stored in either the AVT 220 or MVT(s) 230 in step 480.

By creating a separate table for each multivalue attribute in an index class, the Content Manager 210 is able to support multivalue attributes, while maintaining high performance standards. Executing an index search of a multivalue attribute is now simple because each row in the MVT 230 contains one value. Expensive table scans are not required. Moreover, updating and deleting data is simplified. If the user submits a query requesting to get all attribute values of an item in an index class, the Content Manager 210 will perform a JOIN operation between the corresponding AVT 220 and all associated MVTs 230, if any, keying off the item ID serial number for that item.

Figure 5:
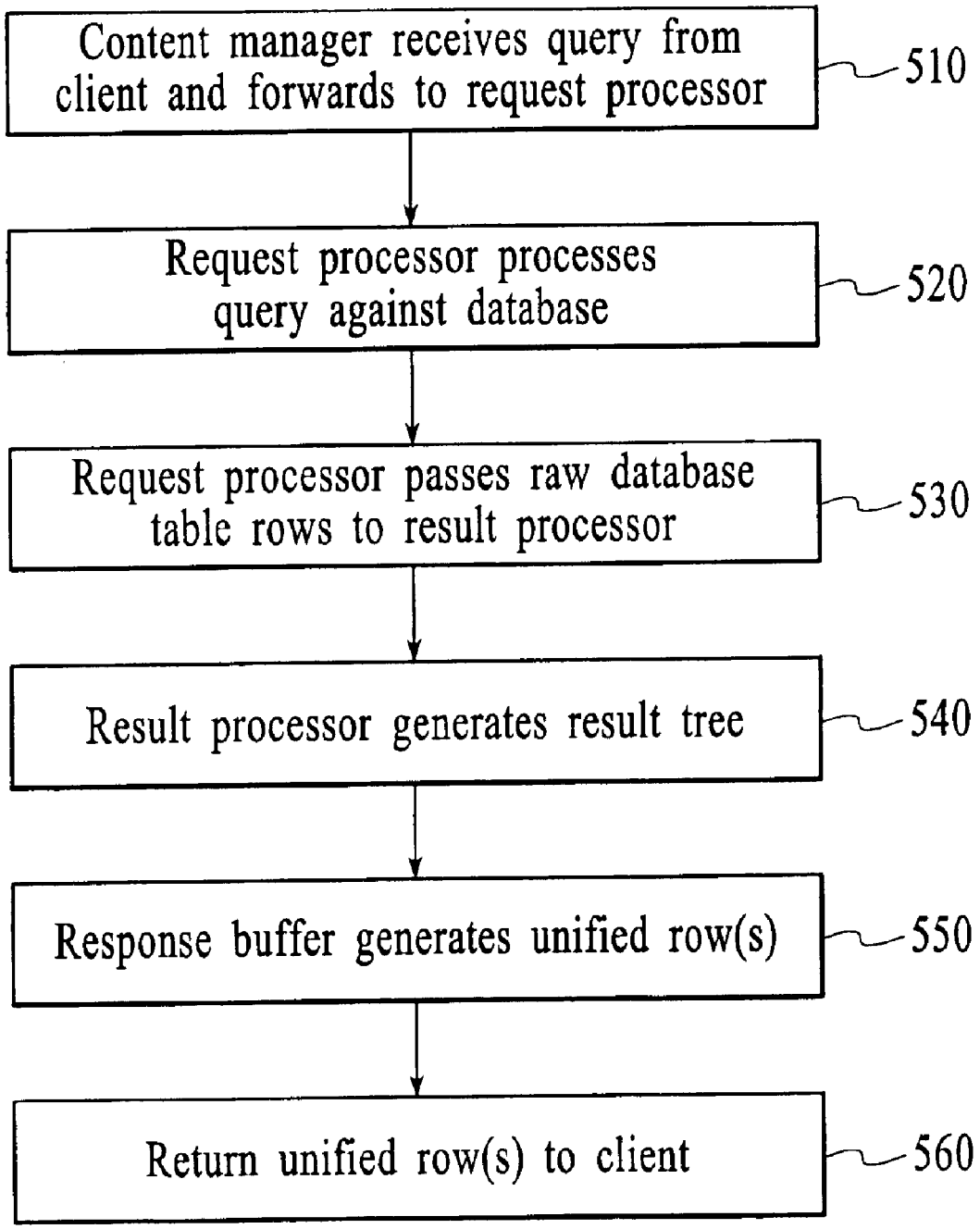
FIG. 5 is a flow chart illustrating the process of retrieving data in response to a query in accordance with an embodiment of the present invention.
Figure 6:
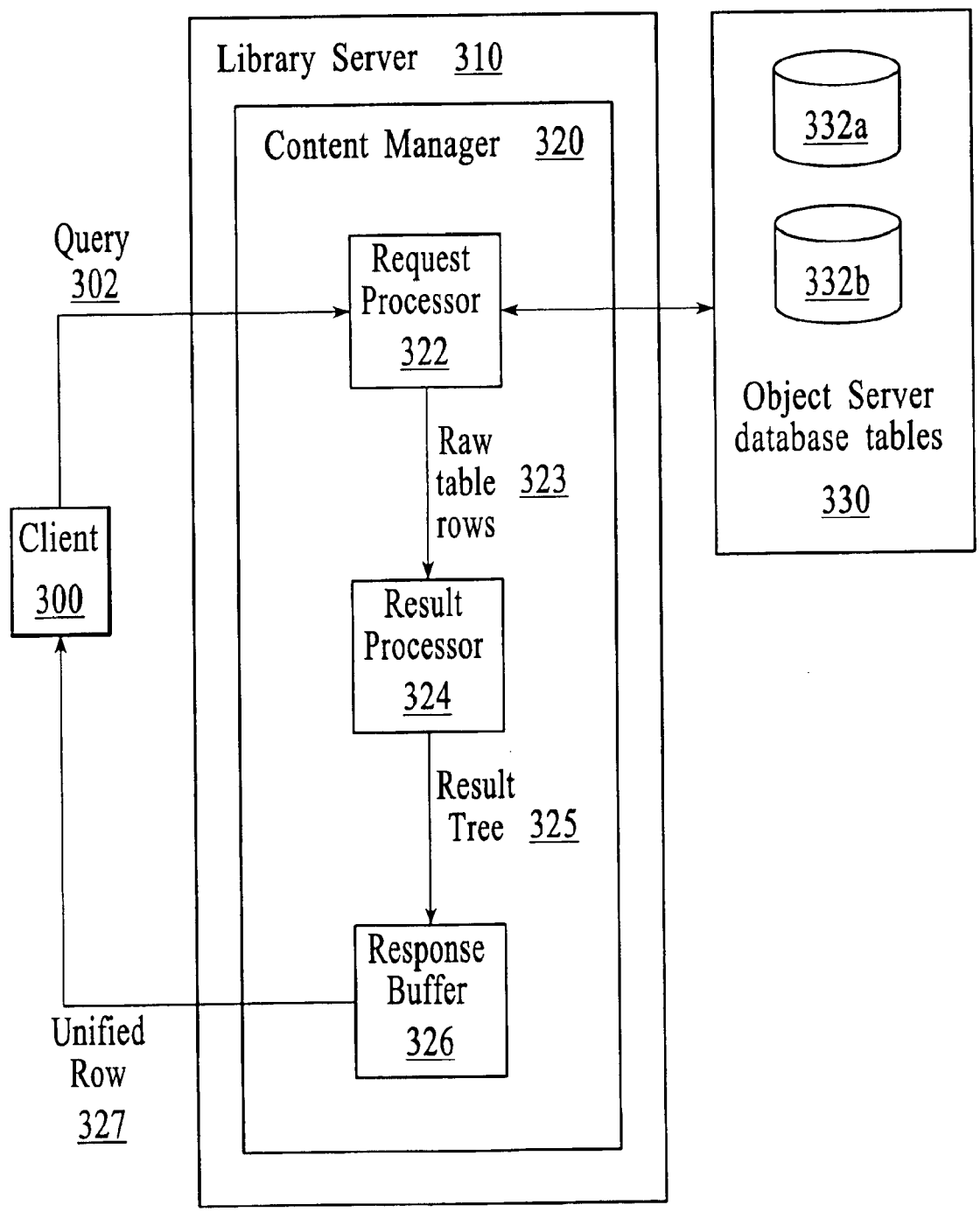
FIG. 6 illustrates a block diagram of the system for retrieving data in response to a query in accordance to a preferred embodiment of the present invention.

FIG. 5 is a flowchart illustrating a process 500 for executing a table query according to a preferred embodiment of the present invention. The query could be in the form of "Find all information regarding patients where Wong is a doctor." In Step 510, the query 302 from the client 300 is received by the Content Manager 320 in the Library Server 310, as shown in FIG. 6, and forwarded to the Request Processor 322. The Request Processor 322 takes the query 302 and processes it in step 520, e.g., transforms the query 302 into an executable plan and retrieves the requested data in the form of raw table rows 323 from the storage devices 332a, 332b via the Object Server 330 database tables. The step of processing the query 302 can be performed using a number of techniques, which are well known to those skilled in the art, but not pertinent to the present invention. The Request Processor 322 receives the raw database table rows 323 and passes them on to the Result Processor 324 in step 530.

For example, for the query "Find all information regarding patients where Wong is a doctor," the Request Processor 322 would recognize that the index class Patient and the attribute Doctors is of interest. The Request Processor 322 could perform a table join between the AVT for Patient (Table 4 (AVT00100)) and the related MVT table representing the attribute Doctors (Table 5 (MVT00005/00100)). Suppose patient Adam Smith is the only patient having Doctor Wong, the raw database table rows returned would be those in Table 6.

TABLE 6

| Item ID Serial No. | 00001 (Last Name) | 00002 (First Name) | 00003 (Soc. Sec. No.) | 00004 (Date Ad) | 00005 (Doctors) |
|---|---|---|---|---|---|
| AR@3EW##1K | Smith | Adam | 012345678 | Jan. 1, 2001 | Jones |
| AR@3EW##1K | Smith | Adam | 012345678 | Jan. 1, 2001 | Wong |
| AR@3EW##1K | Smith | Adam | 012345678 | Jan. 1, 2001 | Flores |

If other patients had Doctor Wong, corresponding rows with different item ID serial numbers would be returned, as well.

Because the query has requested all information regarding patients where Wong is a doctor, each row is relevant because each row contains information that is material to the query. When the index class has multivalue attributes, returning each row to the client could be wasteful and inefficient because much of the information contained in each row is redundant. Rather than taking that approach, the preferred embodiment of the present invention utilizes the Result Processor 324.

Referring back to FIG. 5, once the Result Processor 324 receives the raw table rows from the Request Processor 322, the Result Processor 324 generates a Result Tree 325. The Result Tree 325 is a collection of data grouped by the item identification serial number. The Result Processor 324 processes the data in each raw table row, and collects the non-redundant information under a particular item identification serial number. Thus, the Result Tree 325 contains all relevant information contained in the raw table rows 323, but eliminates the redundancy.

Next, the Result Processor 324 transmits the Result Tree 325 to the Response Buffer 326, where a Unified Row 327 is generated in step 550. The Unified Row 327 is a string of attribute values separated by an internally defined separator. Preferably, one unified row 327 will correspond to one item identification serial number. Optionally, the Response Buffer also creates an appropriate header to identify the index class and attributes listed. Thus, the Unified Row 327 in the above example would be:

AR@3EW##1K, (Smith), (Adam), (012345678), (01/01/01), (Jones, Wong, Flores)

Finally, in step 560, the Unified Row(s) 327 are returned to the client 300. By generating the Unified Row 327, the information returned to the client is streamlined and focused. Moreover, because one unified row per item, as opposed to multiple rows of data per item, is returned to the client, data traffic over the network (from the Library Server 310 to the client 300) is significantly reduced, thereby improving the performance of the system overall.

Through the aspects of the present invention, a database management system can support attributes having multiple values, while maintaining high performance. In the preferred embodiment of the present invention, an AVT is created for storing values for single value attributes in an index class, and an MVT is created for each multivalue attribute of an index class. By generating separate tables for single value attributes and multivalue attributes, highly efficient operations, such as an index scan, can be performed on the MVT to retrieve or update data corresponding to the associated multivalue attribute. Thus, data management becomes more efficient and less costly.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer implemented method for supporting multiple value attributes in a database system comprising the steps of:

a) defining an index class by designating a plurality of attributes associated with the index class, wherein the plurality of attributes includes single value attributes and at least one mulitvalue attribute;

b) generating an attribute value table (AVT) for the index class for storing attribute values for the single value attributes; and c) generating a multiple value table (MVT) for each of the at least one mulitvalue attribute for storing attribute values for the at least one mulitvalue attribute.

2. The method of claim 1, wherein the defining step (a) further comprises:

a1) presenting a list of attributes from which a user can select, wherein each attribute is identified internally by an attribute number.

3. The method of claim 2, wherein the defining step (a) further comprises:

a2) allowing the user to define a new attribute for the index class if the new attribute does not appear on the list of attributes.

4. The method of claim 1, wherein the step of generating the AVT, further comprises:
   b1) assigning an AVT label to the AVT for identifying the index class to which the AVT corresponds; and
   b2) assigning an item identification serial number to each row in the AVT, the item identification serial number corresponding to an item in the index class, wherein each column in the AVT corresponds to a single value attribute in the index class.

5. The method of claim 4, wherein the step of generating a MVT further comprises:
   c1) assigning a MVT label to the MVT for identifying the index class and the multivalue attribute to which the MVT corresponds, wherein each row in the MVT corresponds to one of a plurality of values for the multivalue attribute and each row includes the item identification serial number corresponding to the item in the index class.

6. The method of claim 3, wherein the user designates the plurality of attributes through a client computer system and the steps of generating the AVT and the MVT are performed by a Library Server coupled to the client computer system.

7. The method of claim 6, wherein the Library Server includes an Index Class Definition Table and an Attribute Definition Table and the method further including the steps of:
   d) adding the new attribute defined by the user to the Attribute Definition Table; and
   e) storing an attribute number assigned to the new attribute in the Attribute Definition Table.

8. The method of claim 7 further comprising the steps of:
   f) adding the index class to the Index Class Definition Table; and
   g) assigning an index class number to the index class.

9. The method of claim 8, wherein the Library Server further includes an Index Class Attributes Table for storing information related to the plurality of attributes associated with the index class, the related information including whether an attribute has been designated as a multivalue attribute.

10. The method of claim 9, wherein the step of generating the AVT further comprises the step of:
    b1) utilizing the Index Class Attributes Table to identify the single value attributes in the index class.

11. The method of claim 10 wherein the step of generating the MVT further comprises the step of:
    c1) utilizing the Index Class Attributes Table to identify the multivalue attributes in the index class.

12. A computer readable medium containing program instructions for supporting multiple value attributes in a database system, the program instructions for:
    a) defining an index class by designating a plurality of attributes associated with the index class, wherein the plurality of attributes includes single value attributes and at least one multivalue attribute;
    b) generating an attribute value table (AVT) for the index class for storing attribute values for the single value attributes; and
    c) generating a multiple value table (MVT) for each of the at least one multivalue attribute for storing attribute values for the at least one multivalue attribute.

13. The computer readable medium of claim 12, wherein the defining instruction (a) further comprises:
    a1) presenting a list of attributes from which a user can select, wherein each attribute is identified internally by an attribute number.

14. The computer readable medium of claim 13, wherein the defining instruction (a) further comprises:
    a2) allowing the user to define a new attribute for the index class if the new attribute does not appear on the list of attributes.

15. The computer readable medium of claim 12, wherein the instruction of generating the AVT, further comprises:
    b1) assigning an AVT label to the AVT for identifying the index class to which the AVT corresponds; and
    b2) assigning an item identification serial number to each row in the AVT, the item identification serial number corresponding to an item in the index class, wherein each column in the AVT corresponds to a single value attribute in the index class.

16. The computer readable medium of claim 15, wherein the instruction of generating a MVT further comprises:
    c1) assigning a MVT label to the MVT for identifying the index class and the multivalue attribute to which the MVT corresponds, wherein each row in the MVT corresponds to one of a plurality of values for the multivalue attribute and each row includes the item identification serial number corresponding to the item in the index class.

17. The computer readable medium of claim 14, wherein the user designates the plurality of attributes through a client computer system and the instructions for generating the AVT and the MVT are performed by a Library Server coupled to a client computer system.

18. The computer readable medium of claim 17, wherein the Library Server includes a Index Class Definition Table and an Attribute Definition Table and the computer program medium further including the instructions for:
    d) adding the new attribute defined by the user to the Attribute Definition Table; and
    e) storing an attribute number assigned to the new attribute in the Attribute Definition Table.

19. The computer readable medium of claim 18 further comprising the instructions for:
    f) adding the index class to the Index Class Definition Table; and
    g) assigning an index class number to the index class.

20. The computer readable medium of claim 19, wherein the Library Server further includes an Index Class Attributes Table for storing information related to the plurality of attributes associated with the index class, the related information including whether an attribute has been designated as a multivalue attribute.

21. The computer readable medium of claim 20, wherein the instruction for generating the AVT further comprises the instruction for:
    b1) utilizing the Index Class Attributes Table to identify the single value attributes in the index class.

22. The computer readable medium of claim 21 wherein the instruction for generating the MVT further comprises the instruction for:
    c1) utilizing the Index Class Attributes Table to identify the multivalue attributes in the index class.

23. A system for supporting multiple value attributes in a database system comprising:
    a client computer for allowing a user to define an index class, wherein the index class includes a plurality of attributes, wherein the plurality of attributes includes single value attributes and at least one multivalue attribute;

a library server coupled to the client computer for receiving information about the index class from the user, the library server including means for generating an attribute value table (AVT) for the index class for storing attribute values for the single value attributes and means for generating a multiple value table (MVT) for each of the at least one multivalue attribute for storing attribute values for the at least one multivalue attribute; and an object server coupled to the library server for storing data in the database.

24. The system of claim 23, wherein the client computer includes means for allowing the user to define a new attribute for the index class, setting characteristic properties for the new attribute, and assigning an attribute number to the new attribute.

25. The system of claim 24, wherein the client computer includes means for presenting a list of attributes from which a user can select, wherein each attribute is identified by an attribute number.

26. The system of claim 23, wherein the AVT includes an AVT label for identifying the index class to which the AVT corresponds, and wherein each row in the AVT is assigned an item identification serial number and each column in the AVT corresponds to a single value attribute in the index class.

27. The system of claim 26, wherein the MVT includes a MVT label for identifying the index class and the multivalue attribute to which the MVT corresponds, and wherein each row in the MVT corresponds to one of a plurality of values for the multivalue attribute and each row includes the item identification serial number corresponding to the item in the index class.

28. The system of claim 25, wherein the library server further includes an Index Class Definition Table for defining existing and new index classes, and an Attribute Definition Table for defining existing and new attributes.

29. The system of claim 28, wherein the library server further includes an Index Class Attributes Table for storing information related to the plurality of attributes associated with the index class, and related information including whether an attribute has been designated as a multivalue attribute.

* * * * *

UNITED STATES PATENT AND TRADEMARK OFFICE
CERTIFICATE OF CORRECTION

PATENT NO.  : 6,886,016 B2
DATED       : April 26, 2005
INVENTOR(S) : Hansen et al.

It is certified that error appears in the above-identified patent and that said Letters Patent is hereby corrected as shown below:

Column 5,
Line 49, add -- index -- after "particular" and before "class".
Line 60, add -- and -- after "created" and before "stores".

Signed and Sealed this

Third Day of January, 2006

JON W. DUDAS
*Director of the United States Patent and Trademark Office*